US012749395B2

(12) United States Patent
Kim et al.

(10) Patent No.: US 12,749,395 B2
(45) Date of Patent: Sep. 29, 2026

(54) TRAFFIC SPEED PREDICTION DEVICE AND METHOD THEREFOR

(71) Applicants: Hyundai Motor Company, Seoul (KR); Kia Corporation, Seoul (KR)

(72) Inventors: Nam Hyuk Kim, Seoul (KR); Ja Yun Huh, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 245 days.

(21) Appl. No.: 18/172,178

(22) Filed: Feb. 21, 2023

(65) Prior Publication Data

US 2024/0038064 A1 Feb. 1, 2024

(30) Foreign Application Priority Data

Jul. 29, 2022 (KR) ........................ 10-2022-0094844

(51) Int. Cl.
*G08G 1/052* (2006.01)
*G08G 1/01* (2006.01)

(52) U.S. Cl.
CPC ............. *G08G 1/052* (2013.01); *G08G 1/012* (2013.01); *G08G 1/0125* (2013.01)

(58) Field of Classification Search
None
See application file for complete search history.

(56) References Cited

U.S. PATENT DOCUMENTS

2008/0004789 A1* 1/2008 Horvitz ................ G08G 1/0104 340/936
2008/0059051 A1* 3/2008 Kumagai ............. G08G 1/0104 701/117
2010/0070253 A1* 3/2010 Hirata .................. G08G 1/0104 703/8

(Continued)

FOREIGN PATENT DOCUMENTS

KR 20220081208 A 6/2022
KR 20220138263 A 10/2022
KR 20230134915 A 9/2023

OTHER PUBLICATIONS

Y. Kim, P. Wang and L. Mihaylova, "Scalable Learning With a Structural Recurrent Neural Network for Short-Term Traffic Prediction," in IEEE Sensors Journal, vol. 19, No. 23, pp. 11359-11366, 1 Dec. 1, 2019, doi: 10.1109/JSEN.2019.2933823. (Year: 2019).*

*Primary Examiner* — Faris S Almatrahi
*Assistant Examiner* — Selena M Jin
(74) *Attorney, Agent, or Firm* — Slater Matsil, LLP

(57) ABSTRACT

In an embodiment a traffic speed prediction device includes at least one processor is configured to determine a second section connected with a first section, wherein the second section is a target road section, and wherein the first section includes a road section in front of the second section, to output first output data using traffic speed data during a first time, the traffic speed data being obtained based on probe data collected in the first section and the second section, to output second output data using traffic volume data during a (Continued)

second time, the traffic volume data being obtained based on the probe data collected in the first section and the second section, and to predict a traffic speed of the road including the second section using the first output data and the second output data.

16 Claims, 11 Drawing Sheets

(56) References Cited

U.S. PATENT DOCUMENTS

2012/0109506 A1* 5/2012 Fei ........................ G08G 1/0116
701/118
2015/0120174 A1* 4/2015 Lewis .................. G08G 1/0129
701/118
2016/0300150 A1* 10/2016 Watts-Fitzgerald ... G08G 1/012
2017/0076596 A1* 3/2017 Scofield ................ B60W 40/09
2018/0108251 A1* 4/2018 Macfarlane .......... G08G 1/0129
2018/0174445 A1* 6/2018 Rolf ...................... G08G 1/0141
2018/0292224 A1* 10/2018 Brodski ............... G08G 1/0112
2018/0299559 A1* 10/2018 Zhao ................ G08G 1/096844
2019/0180612 A1* 6/2019 Demiryurek ......... G08G 1/0116
2020/0042799 A1* 2/2020 Huang ................. G06V 10/764
2020/0143672 A1* 5/2020 Ashida ................. G08G 1/0145
2020/0372322 A1* 11/2020 Wang ..................... G08G 1/012
2020/0393262 A1* 12/2020 Liu ........................ G06V 20/54
2021/0142661 A1* 5/2021 Sheynman ........... G08G 1/0133
2021/0241543 A1* 8/2021 Nishioka ................ G06N 20/00
2022/0005100 A1* 1/2022 Chow ................ G06Q 30/0631
2022/0180737 A1 6/2022 Kim
2022/0327918 A1 10/2022 Kim
2023/0160705 A1* 5/2023 Xu ........................... G06N 5/04
701/533
2023/0196913 A1* 6/2023 Shnaider ................ G06N 20/00
701/428
2023/0298461 A1 9/2023 Kim
2023/0343209 A1* 10/2023 Ionescu ................ G08G 1/0116
2023/0410643 A1* 12/2023 Stenneth .............. G08G 1/0116

* cited by examiner

〈RELATIONSHIP BETWEEN REMAINING TRAFFIC VOLUME AND TRAFFIC SPEED〉

TRAFFIC SPEED PREDICTION DEVICE AND METHOD THEREFOR

CROSS-REFERENCE TO RELATED APPLICATIONS

This application claims the benefit of Korean Application No. 10-2022-0094844, filed on Jul. 29, 2022, which application is hereby incorporated herein by reference.

TECHNICAL FIELD

The present disclosure relates to a traffic speed prediction device and a method therefor, and more particularly, relates to a traffic speed prediction device for predicting a traffic speed during a specified time in the future using traffic speed data and/or traffic volume data, based on a plurality of deep learning devices and a prediction model, and a method therefor.

BACKGROUND

A prediction device according to an existing technology may predict a traffic speed during a specified time in the future using traffic speed data during a specified time in the past. For example, the prediction device may perform future prediction using past data by means of deep learning.

In general, the deep learning is a kind of machine learning, which refers to an artificial neural network (ANN) including multiple hidden layers between an input layer and an output layer.

The existing technology for predicting a traffic speed based on the deep learning performs supervised learning of a model based on training data composed of a pair of input data and output data (right answer data) and predicts a traffic speed in the future using the model, the supervised learning of which is completed.

Meanwhile, existing traffic volume data used to predict a traffic speed includes only traffic volume data of a probe passing through a collection point and does not include traffic volume of a probe which does not pass through the collection point. Due to this, because a correlation with a future traffic speed to be predicted decreases, learning is performed in a direction where the performance of a prediction model is degraded.

SUMMARY

Embodiments solve the above-mentioned problems occurring in the prior art while advantages achieved by the prior art are maintained intact.

Embodiments provide a traffic speed prediction device for receiving a past traffic speed and past traffic volume and predicting a future traffic speed and a method therefor.

Further embodiment provide a traffic speed prediction device for predicting a future traffic situation using traffic volume data showing a close correlation with a traffic situation and a method therefor.

According to an embodiment of the present disclosure, a traffic speed prediction device may include a communication module that receives probe data from a probe vehicle traveling on a road, a memory storing a traffic speed prediction model, and at least one processor electrically connected with the communication module and the memory. The at least one processor may determine a second section connected with a first section, the second section in which the probe data is collected, as a target road section, the first section including a road section in front of the second section, may output first output data using traffic speed data during a first time, the traffic speed data being obtained based on probe data collected in the first section and the second section, may output second output data using traffic volume data during a second time, the traffic volume data being obtained based on the probe data collected in the first section and the second section, and may predict a traffic speed of a road including the second section by means of the traffic speed prediction model, using at least some of the first output data and the second output data.

In an embodiment, the at least one processor may calculate remaining traffic volume corresponding to the number of probe vehicles which are traveling in the second section, using probe data in the second section and probe data in the first section, when there is the probe data in the first section. The second output data may include the remaining traffic volume.

In an embodiment, the remaining traffic volume may be calculated by subtracting the number of probe vehicles passing through a last point of the first section from the number of probe vehicles passing through a last point of the second section.

In an embodiment, the at least one processor may calculate exiting traffic volume corresponding to the number of probe vehicles passing through a last point of the second section, when there is no probe data in the first section. The second output data may include the exiting traffic volume without including the remaining traffic volume.

In an embodiment, the at least one processor may obtain input data calculated by performing concatenate operation of the first output data and the second output data and may predict a traffic speed during a specified third time in the future by means of the traffic speed prediction model, using the input data.

In an embodiment, the at least one processor may learn a weight included in the traffic speed prediction model such that a mean squared error (MSE) of the predicted traffic speed during the third time is reduced.

In an embodiment, the first time and the second time may correspond to substantially the same past time.

In an embodiment, the at least one processor may determine the target road section, based on at least one of direction information included in link information of the first section and the second section, whether probe data is detected in the first section, or a combination thereof.

In an embodiment, the memory may further store a plurality of probe data generation models. The at least one processor may collect probe vehicles in the first section and the second section during a unit time, may determine a probe data generation model, corresponding to a road characteristic with the highest similarity with road characteristics of the first section and the second section, among the plurality of probe data generation models, as a probe data generation model of the target road section, when the number of the collected probe vehicles is less than or equal to a threshold, and may output the first output data and the second output data, based on the probe data generation model of the target road section.

In an embodiment, the at least one processor may determine a probe data generation model, which has the number of probe vehicles with the smallest difference with the number of the collected probe vehicles as a road characteristic, as the probe data generation model of the target road section, when the probe data generation model corresponding to the road characteristic with the highest similarity with the road characteristics of the first section and the second section is not detected.

According to another embodiment of the present disclosure, a traffic speed prediction method may include determining, by at least one processor, a second section connected with a first section, the second section in which probe data is collected, as a target road section, the first section including a road section in front of the second section, outputting, by the at least one processor, first output data using traffic speed data during a first time, the traffic speed data being obtained based on probe data collected in the first section and the second section, outputting, by the at least one processor, second output data using traffic volume data during a second time, the traffic volume data being obtained based on the probe data collected in the first section and the second section, and predicting, by the at least one processor, a traffic speed of a road including the second section by means of the traffic speed prediction model, using at least some of the first output data and the second output data.

In an embodiment, the traffic speed prediction method may further include calculating, by the at least one processor, remaining traffic volume corresponding to the number of probe vehicles which are traveling in the second section, using probe data in the second section and probe data in the first section, when there is the probe data in the first section. The second output data may include the remaining traffic volume.

In an embodiment, the remaining traffic volume may be calculated by subtracting the number of probe vehicles passing through a last point of the first section from the number of probe vehicles passing through a last point of the second section.

In an embodiment, the traffic speed prediction method may further include calculating, by the at least one processor, exiting traffic volume corresponding to the number of probe vehicles passing through a last point of the second section, when there is no probe data in the first section. The second output data may include the exiting traffic volume without including the remaining traffic volume.

In an embodiment, the traffic speed prediction method may further include obtaining, by the at least one processor, input data calculated by performing concatenate operation of the first output data and the second output data and predicting, by the at least one processor, a traffic speed during a specified third time in the future by means of the traffic speed prediction model, using the input data.

In an embodiment, the traffic speed prediction method may further include learning, by the at least one processor, a weight included in the traffic speed prediction model such that a mean squared error (MSE) of the predicted traffic speed during the third time is reduced.

In an embodiment, the first time and the second time may correspond to substantially the same past time.

In an embodiment, the determining of the second section as the target road section may include determining, by the at least one processor, the target road section, based on at least one of direction information included in link information of the first section and the second section, whether probe data is detected in the first section, or a combination thereof.

In an embodiment, the traffic speed prediction method may further include collecting, by the at least one processor, probe vehicles in the first section and the second section during a unit time, determining, by the at least one processor, a probe data generation model, corresponding to a road characteristic with the highest similarity with road characteristics of the first section and the second section, among the plurality of probe data generation models stored in a memory, as a probe data generation model of the target road section, when the number of the collected probe vehicles is less than or equal to a threshold, and outputting, by the at least one processor, the first output data and the second output data, based on the probe data generation model of the target road section.

In an embodiment, the traffic speed prediction method may further include determining, by the at least one processor, a probe data generation model, which has the number of probe vehicles with the smallest difference with the number of the collected probe vehicles as a road characteristic, as the probe data generation model of the target road section, when the probe data generation model corresponding to the road characteristic with the highest similarity with the road characteristics of the first section and the second section is not detected.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
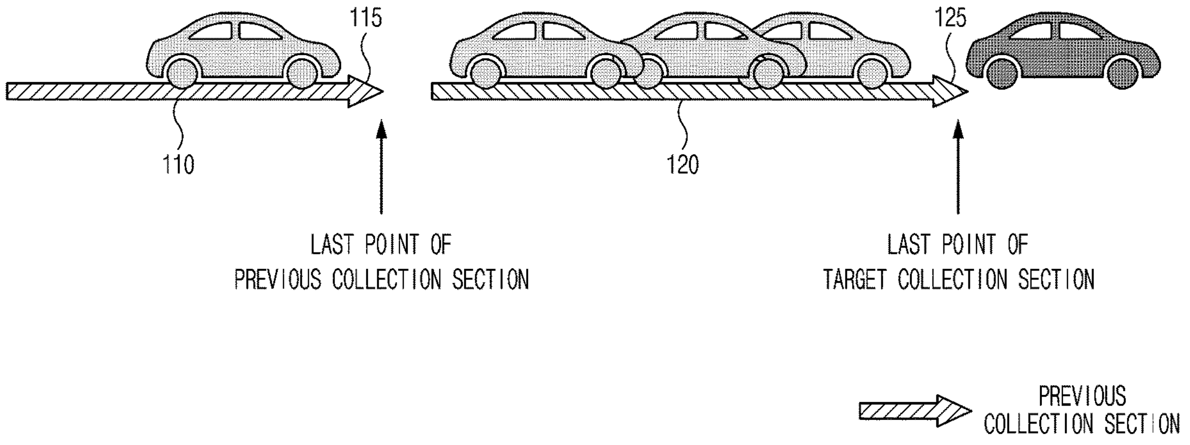
FIG. 1 illustrates remaining traffic volume and exiting traffic volume in a traffic speed prediction device and a method therefor according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

FIG. 1 illustrates remaining traffic volume and exiting traffic volume in a traffic speed prediction device and a method therefor according to an embodiment of the present disclosure.

Referring to FIG. 1, in the traffic speed prediction device and the method therefor according to an embodiment, a target collection section 120 may include a section in which probe data is collected. Furthermore, the target collection section 120 may include a road section connected with a forward road section in which probe data is collected.

Hereinafter, in the disclosure, the target collection section may be referred to as a second section, a target road, a target section, a target road section, or the like.

Furthermore, the forward road section connected with the target collection section may be referred to as a first section, a previous collection section, or the like.

In the traffic speed prediction device and the method therefor according to an embodiment of the present disclosure, the exiting traffic volume may be defined as the number of all of probe vehicles leaving the target collection section 120.

For example, when the number of probe vehicles leaving the target collection section 120 during a specified time is one, the exiting traffic volume may be defined as "1".

According to an embodiment, in the traffic speed prediction device and the method therefor, the remaining traffic volume may be defined as the number of probe vehicles, which is obtained by subtracting the number of probe vehicles passing through a first point 115 which is a last point of the previous collection section 110 of the target collection section 120 from the number of probe vehicles passing through a second point 125 which is a last point of the target collection section 120. In other words, the remaining traffic volume may be defined as the number of probe vehicles which is traveling in the target collection section 120.

For example, when the number of probe vehicles which are traveling in the target collection section 120 during a specified time is three, the remaining exiting traffic volume may be defined as "3".

Figure 2:
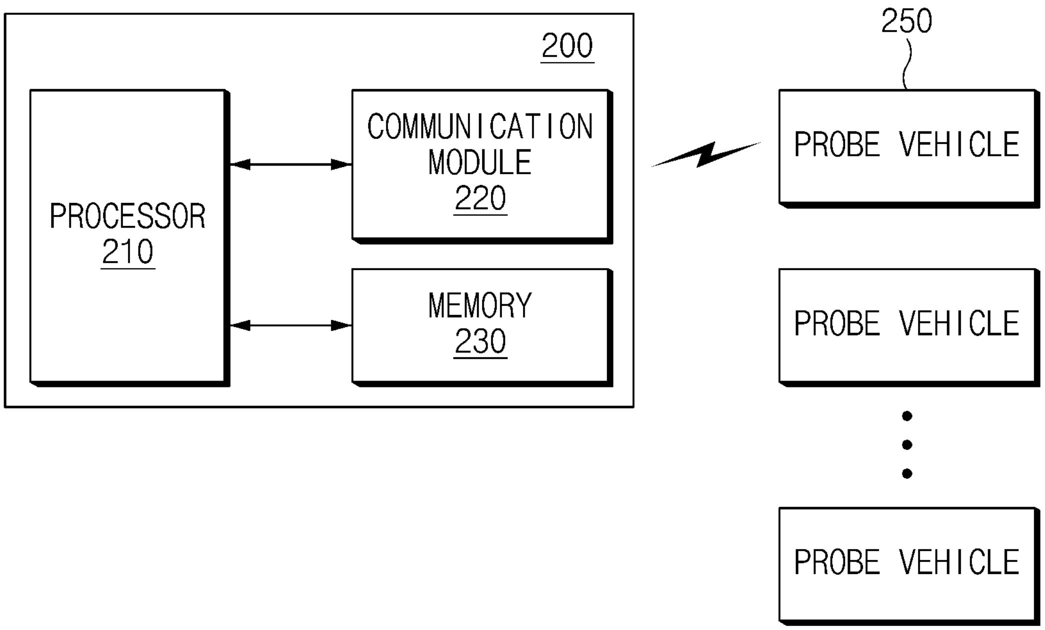
FIG. 2 is a block diagram of a traffic speed prediction device according to an embodiment of the present disclosure.

FIG. 2 is a block diagram of a traffic speed prediction device according to an embodiment of the present disclosure.

Referring to FIG. 2, a traffic speed prediction device 200 according to an embodiment may include a processor 210, a communication module 220, and a memory 230. The respective components may be combined into one component and some components may be omitted, depending on a manner which executes the traffic speed prediction device 200 according to an embodiment of the present disclosure.

The processor 210 may perform the overall control such that respective components may normally perform their own functions. Such a processor 210 may be implemented in the form of hardware, may be implemented in the form of software, or may be implemented in the form of a combination thereof. Preferably, the processor 210 may be implemented as, but not limited to, a microprocessor.

According to an embodiment, the processor 210 may receive global positioning system (GPS) data (including time data) on a periodic basis from a probe vehicle 250 through the communication module 220, thus identifying a location of the probe vehicle 250 in real time. Thus, the processor 210 may know a time when the probe vehicle 250 enters a target road section and may calculate a time taken (or a time required) for the probe vehicle 250 to pass through the target road section as traffic information based on the time when the probe vehicle 250 enters the target road section and the calculated time when the probe vehicle 250 passes through the target road section.

The processor 210 may interwork with a navigation system (not shown) to identify a location of the probe vehicle 250 in real time. In other words, the processor 210 may detect a location of the probe vehicle 250 on the road based on GPS data received from the probe vehicle 250.

The communication module 220 may be a module for providing a communication interface with the probe vehicle 250 which travels on the road, which may receive probe data on a periodic basis from the probe vehicle 250. In this case, the probe vehicle 250 may have a telematics terminal as a vehicle terminal Such a communication module 220 may include at least one of a mobile communication module, a wireless Internet module, or a short-range communication module to communicate with the probe vehicle 250.

The mobile communication module may communicate with the probe vehicle 250 over a mobile communication network established according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like), 4th generation (4G) mobile telecommunication, or 5th generation (5G) mobile telecommunication.

The wireless Internet module may be a module for wireless Internet access, which may communicate with the probe vehicle 250 through wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The short-range communication module may support short-range communication using at least one of Bluetooth™, radio frequency identification (RFID), infrared data association (IrDA), ultra-wideband (UWB), ZigBee, near field communication (NFC), and wireless universal serial bus (USB) technologies.

According to an embodiment, the memory 230 may store a traffic speed prediction model which predicts a traffic speed.

In an embodiment, the memory 230 may store input data to be used for the traffic speed prediction device 200 to calculate a prediction result and/or result data output by the traffic speed prediction device 200. In this case, the input data may include probe data received using the communication module 220 from the probe vehicle 250.

According to an embodiment, the probe data may include GPS data, coordinate data, and/or time data.

According to an embodiment, the memory 230 may store various logic, algorithms, and programs required in a process of processing input data and output data to predict a traffic speed.

According to an embodiment, the memory 230 may store a plurality of probe data generation models, learning of which is completed for each characteristic of the road.

The memory 230 may include at least one type of storage medium such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

Figure 3:
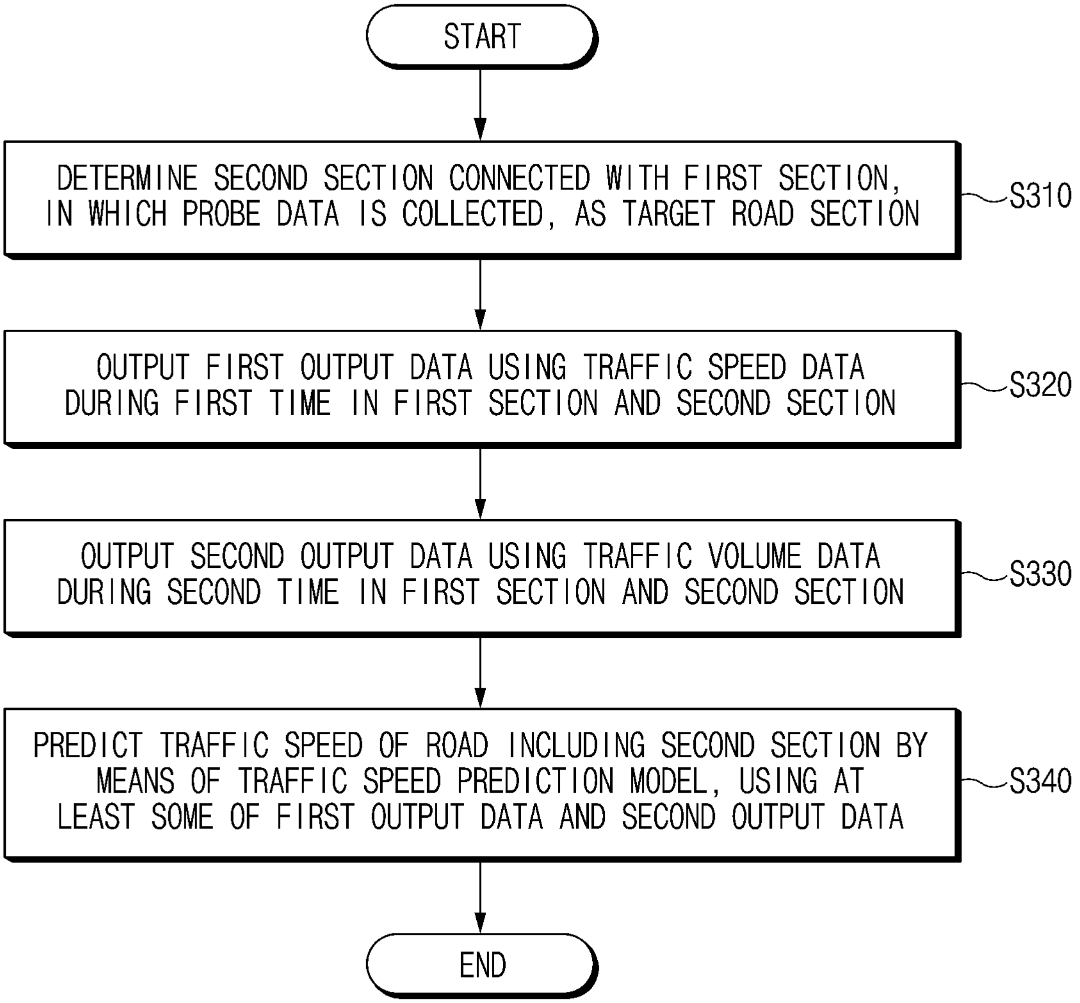
FIG. 3 is a flowchart illustrating predicting a traffic speed using a traffic speed prediction model in a traffic speed prediction device and a method therefor according to an embodiment of the present disclosure.

FIG. 3 is a flowchart illustrating predicting a traffic speed using a traffic speed prediction model in a traffic speed prediction device and a method therefor according to an embodiment of the present disclosure.

Operations in S310 to S340 in an embodiment below may be sequentially performed, but are not necessarily sequentially performed. For example, an order of the respective operations may be changed, and at least two operations may be performed in parallel.

Referring to FIG. 3, in the traffic speed prediction device and the method therefor according to an embodiment, in S310, a processor may determine a second section connected with a first section, in which probe data is connected, as a target road section. For example, the first section may include a road section in front of the second section.

According to an embodiment, the processor may determine the target road section, based on at least one of direction information included in link information of the first section and the second section, whether probe data is detected in the first section, or a combination thereof.

According to an embodiment, the processor may differently determine whether the second section is connected with the first section, depending on a characteristic of the road.

For example, when the second section is a city road, the processor may determine whether the second section is connected with the first section, based on whether a direction included in link information of the first section which is a road section in front of the second section and a direction included in link information of the second section are identical to each other. In detail, when the direction included in the link information of the first section and the direction included in the link information of the second section are identical to each other, the processor may determine whether the second section is connected with the first section.

Furthermore, for example, when the second section is a city road, the processor may determine whether the second section is connected with the first section, based on whether probe data is detected in the first section which is a road section in front of the second section. In detail, when the probe data is detected in the first section and the probe data is detected in the second section, the processor may determine whether the second section is connected with the first section.

For another example, when the second section is a highway, the processor may determine whether the second section is connected with the first section, based on whether probe data is detected in the first section which is the road section in front of the second section. In detail, when the probe data is detected in the first section and when the probe data is detected in the second section, the processor may determine whether the second section is connected with the first section.

For example, when the second section is a highway and when the first section which is the road in front of the second section, the processor may determine whether the second section is connected with the first section, when the direction included in the link information of the first section and the direction included in the link information of the second section are identical to each other.

According to the above-mentioned embodiment, the traffic speed prediction device according to an embodiment of the present disclosure may easily predict a future traffic speed using the remaining traffic volume even when vehicles enters from several roads, for example, at an intersection of a city road.

Furthermore, according to the above-mentioned embodiment, the traffic speed prediction device according to an embodiment of the present disclosure may easily determine congestion using the remaining traffic volume even when there is no blockage of traffic flow by signals, for example, on a highway.

According to an embodiment, in S320, the processor may output first output data using traffic speed data during a first time, which is obtained based on the probe data collected in the first section and the second section.

According to an embodiment, the processor may output the first output data by means of a first deep learning device (e.g., a traffic speed deep learning device), using the traffic speed data during the first time, which is obtained based on the probe data collected in the first section and the second section.

According to an embodiment, the processor may input the traffic speed data during the first time to an input layer of the first deep learning device and may obtain first output data, in which the input traffic speed data is output through a plurality of layers included in the first deep learning device, through an output layer of the first deep learning device.

According to an embodiment, in S330, the processor may output second output data using traffic volume data during a second time, which is obtained based on the probe data collected in the first section and the second section.

According to an embodiment, the processor may output the second output data by means of a second deep learning device (e.g., a traffic volume deep learning device), using the traffic volume data during the second time, which is obtained based on the probe data collected in the first section and the second section.

According to an embodiment, the processor may input the traffic volume data during the second time to an input layer of the second deep learning device and may obtain the second output data, in which the input traffic volume data is output through a plurality of layers included in the second deep learning device, through an output layer of the second deep learning device.

According to an embodiment, when there is probe data in the first section, the processor may calculate remaining traffic volume corresponding to the number of probe vehicles which are traveling in the second section, using the probe data in the second section and the probe data in the first section.

For example, the remaining traffic volume may be calculated by subtracting the number of probe vehicles passing through a last point of the first section from the number of probe vehicles passing through a last point of the second section.

According to an embodiment, when there is no probe data in the first section, the processor may calculate exiting traffic volume corresponding to the number of probe vehicles passing through the last point of the second section. In this case, the second output data may include the exiting traffic volume without including the remaining traffic volume.

According to an embodiment, in S340, the processor may predict a traffic speed of a road including the second section by means of a traffic speed prediction model, using at least some of the first output data and the second output data.

According to an embodiment, the processor may perform concatenate operation of the first output data and the second output data to obtain the calculated input data.

According to an embodiment, the processor may predict a traffic speed during a specified time in the future by means of the traffic speed prediction model, using the input data.

For example, the processor may predict a traffic speed during a specified time in the future on a road including the second section by means of the traffic speed prediction model.

According to an embodiment, the processor may learn a weight included in the traffic speed prediction model such that a mean squared error (MSE) of the predicted traffic speed during the time is reduced.

Figure 4A:
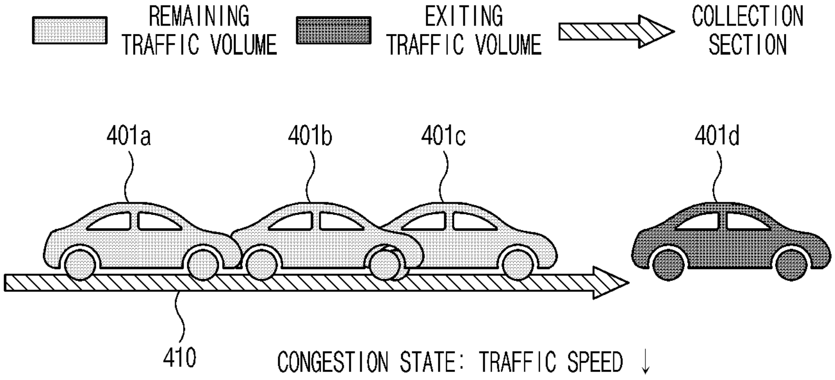
FIG. 4A illustrates an embodiment indicating a relationship between remaining traffic volume and a traffic speed in a traffic speed prediction device and a method therefor according to an embodiment of the present disclosure.
Figure 4B:
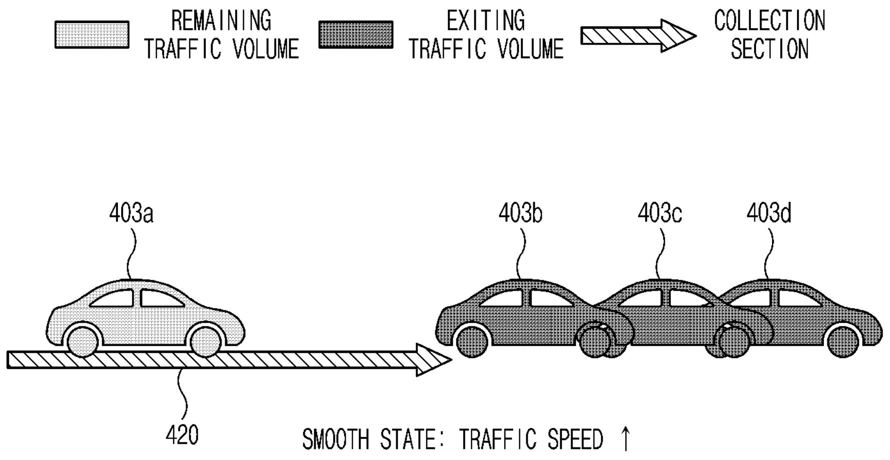
FIG. 4B illustrates another embodiment indicating a relationship between remaining traffic volume and a traffic speed in a traffic speed prediction device and a method therefor according to an embodiment of the present disclosure.

FIG. 4A illustrates an embodiment indicating a relationship between remaining traffic volume and a traffic speed in a traffic speed prediction device and a method therefor according to an embodiment of the present disclosure. FIG. 4B illustrates another embodiment indicating a relationship between remaining traffic volume and a traffic speed in a traffic speed prediction device and a method therefor according to an embodiment of the present disclosure.

Referring to FIGS. 4A and 4B, in the traffic speed prediction device and the method therefor according to an embodiment of the present disclosure, the remaining traffic volume may be used as an index indicating the density of vehicles in a target collection section 410 or 420. Furthermore, the remaining traffic volume may have a direct influence on a traffic speed of a vehicle passing through a corresponding section.

In the traffic speed prediction device and the method therefor according to an embodiment of the present disclosure, the remaining traffic volume and the traffic speed have an inverse relationship.

Referring to FIG. 4A, the exiting traffic volume corresponding to the number of probe vehicle 401*d* passing through a last point of the target collection section 410 is "1", and the remaining traffic volume corresponding to the number of probe vehicles 401*a*, 401*b*, and 401*c* which are traveling in the target collection section 410 may be "3".

According to an embodiment, as the remaining traffic volume of the target collection section 410 increases, because the passage of the vehicle is delayed, an average passing speed decreases. For example, as the number of probe vehicles which are traveling in the target collection section 410 increases, the traffic speed decreases.

Referring to FIG. 4B, the exiting traffic volume corresponding to the number of probe vehicles 403*b*, 403*c*, and 403*d* passing through a last point of the target collection section 420 is "3", and the remaining traffic volume corresponding to the number of probe vehicle 403*a* which is traveling in the target collection section 420 may be "1".

According to an embodiment, as the remaining traffic volume of the target collection section 420 decreases, because the passage of the vehicle is smooth, an average passing speed increases. For example, as the number of probe vehicles which are traveling in the target collection section 420 decreases, the traffic speed increases.

Figure 5A:
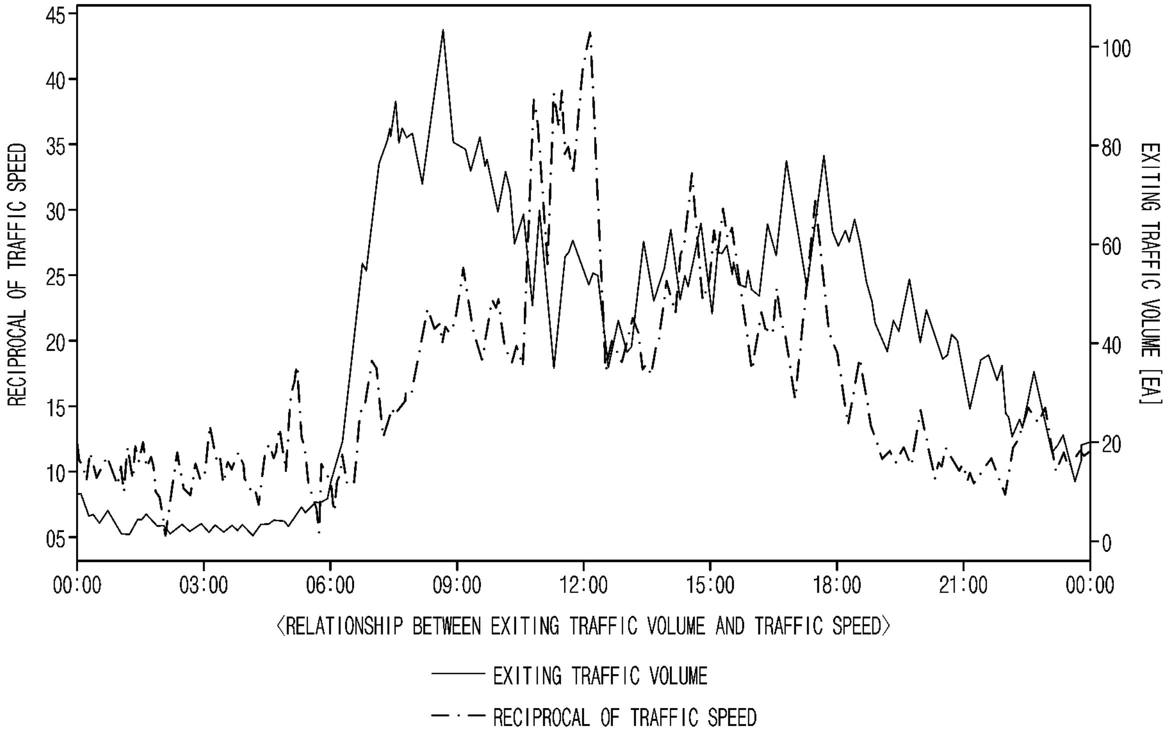
FIG. 5A illustrates a relationship between exiting traffic volume and a traffic speed according to an embodiment of the present disclosure.

FIG. 5A illustrates a relationship between exiting traffic volume and a traffic speed according to an embodiment of the present disclosure.

Referring to FIG. 5A, exiting traffic volume corresponding to the number of probe vehicles passing through a last point of a target road section may indicate a feature in which a reciprocal of a traffic speed reaches a threshold immediately before congestion starts, but a correlation with the traffic speed is not high. Furthermore, as a relationship between the exiting traffic volume and the traffic speed decreases after congestion occurs, the utilization of the exiting traffic volume for predicting a traffic speed decreases.

Figure 5B:
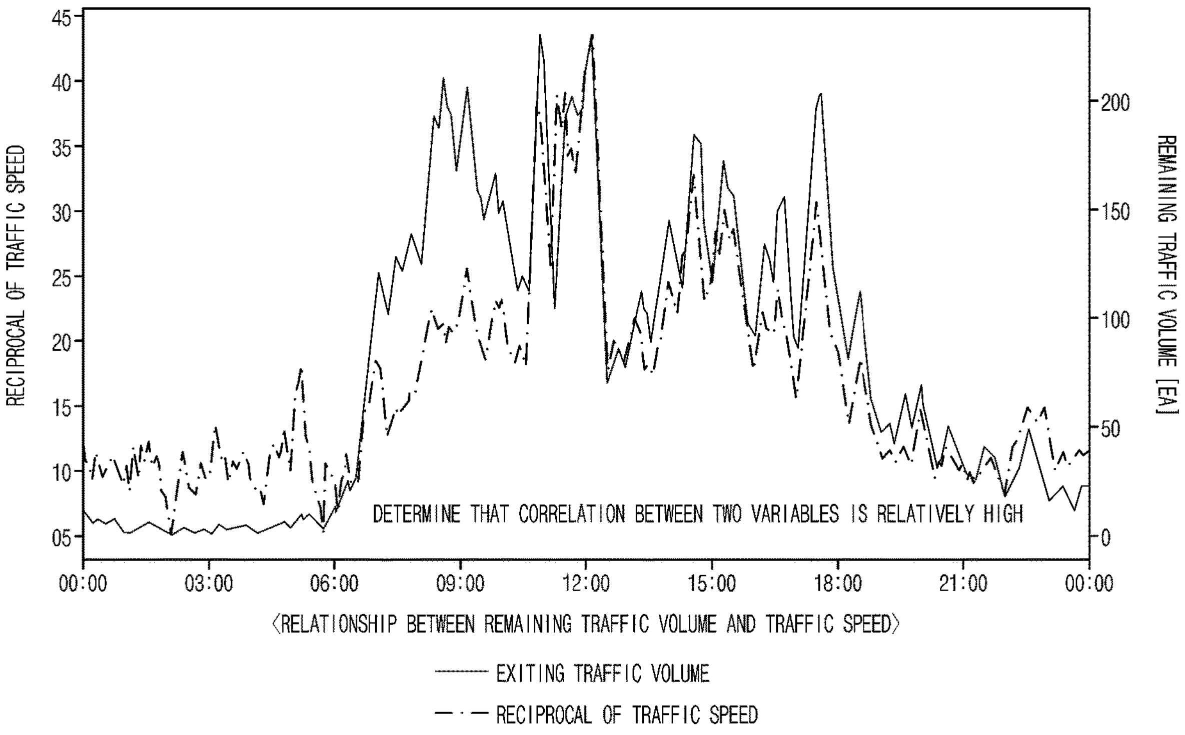
FIG. 5B illustrates a relationship between remaining traffic volume and a traffic speed according to an embodiment of the present disclosure.

FIG. 5B illustrates a relationship between remaining traffic volume and a traffic speed according to an embodiment of the present disclosure.

Referring to FIG. 5B, remaining traffic volume corresponding to the number of probe vehicles which are traveling in a target road section is a variable having a close correction with a traffic state in the target road section. Furthermore, relatively high remaining traffic volume is collected immediately before congestion starts, and a relationship between the remaining traffic volume and the traffic speed is evident even after the congestion occurs. Thus, the remaining traffic volume may increase in utilization in traffic speed prediction even at a time when the congestion starts and at a time when the congestion is resolved.

Figure 6:
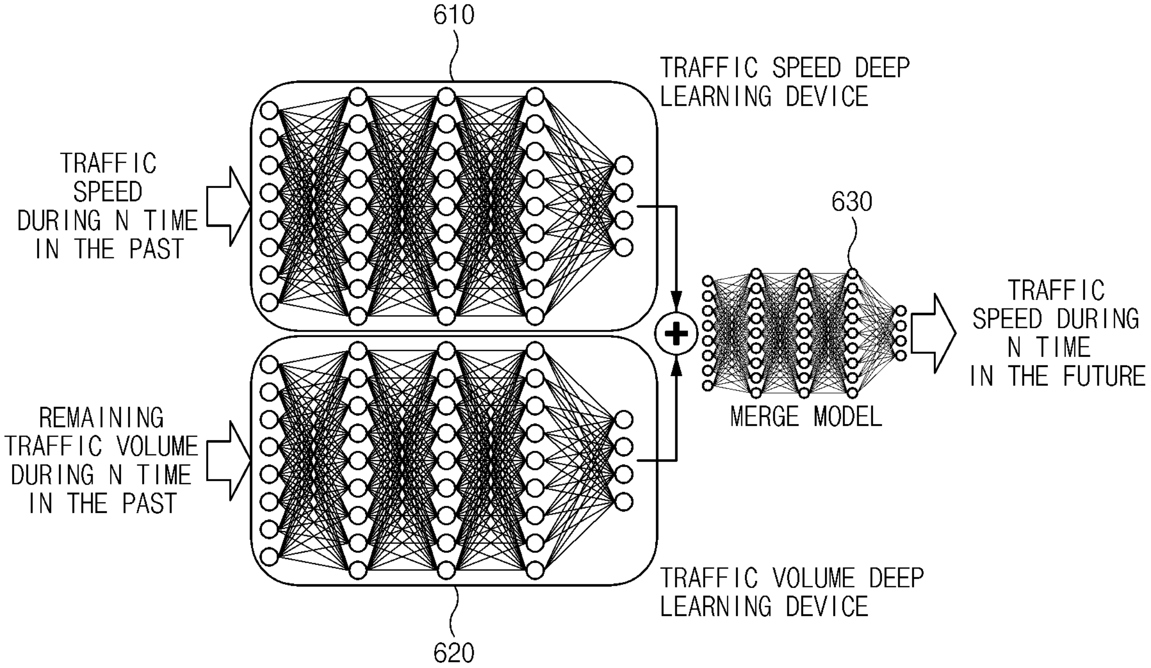
FIG. 6 illustrates a traffic speed prediction model for predicting a traffic speed using traffic speed data and traffic volume data in a traffic speed prediction device and a method therefor according to an embodiment of the present disclosure.

FIG. 6 illustrates a traffic speed prediction model for predicting a traffic speed using traffic speed data and traffic volume data in a traffic speed prediction device and a method therefor according to an embodiment of the present disclosure.

Referring to FIG. 6, a traffic speed prediction device 200 according to an embodiment of the present disclosure may include a plurality of artificial neural networks (ANNs).

According to an embodiment, the traffic speed prediction device 200 may control at least one ANN using a processor (not shown).

For example, the traffic speed prediction device 200 may input data to an ANN and may provide a traffic speed prediction function based on a driving situation (e.g., a traffic speed and/or traffic volume) of a vehicle by means of output data output through various layers included in the ANN.

According to an embodiment, the traffic speed prediction device 200 may include a first deep learning device 610, a second deep learning device 620, and a traffic speed prediction model 630. Each of the shown components may be a component implemented in an ANN structure including at least one layer (e.g., an input layer, an output layer, and multiple hidden layers arranged between the input layer and the output layer).

According to an embodiment, the traffic speed prediction device 200 may input traffic speed data to the input layer of the first deep learning device 610 and may obtain first output data output to the output layer through the plurality of layers.

According to an embodiment, the traffic speed data may include traffic speed data during a first time in the past.

According to an embodiment, the traffic speed prediction device 200 may input traffic volume data to the input layer of the second deep learning device 620 and may obtain second output data output to the output layer through the plurality of layers.

According to an embodiment, the traffic volume data may include traffic volume data during a second time in the past.

According to an embodiment, the second output data may include remaining traffic volume corresponding to the number of probe vehicles which are traveling in a second section.

For example, the remaining traffic volume may be calculated by subtracting the number of probe vehicles passing through a last point of a previous section connected with a target road section from the number of probe vehicles passing through a last point of the target road section.

According to an embodiment, the first time and the second time may be substantially the same time as each other. In detail, the first time and the second time may be defined as substantially the same past time zone with respect to a period of time when input data is input.

According to an embodiment, the traffic speed prediction device 200 may predict a traffic speed by means of the traffic speed prediction model 630, using at least some of the first output data and the second output data.

According to an embodiment, the processor may perform concatenate operation of the first output data and the second output data to obtain the calculated input data.

According to an embodiment, the traffic speed prediction device 200 may input the calculated input data to the input layer of the traffic speed prediction model 630 and may predict a traffic speed based on at least a portion of data output to the output layer of the traffic speed prediction model 630 through the plurality of layers.

According to an embodiment, the traffic speed prediction device 200 may input the input data to the traffic speed prediction model 630 and may predict a traffic speed from the current time to a specified time in the future based on at least a portion of data output to the output layer of the traffic speed prediction model 630 through the plurality of layers.

According to an embodiment, the traffic speed prediction device 200 may update a weight included in the traffic speed prediction model 630, using the predicted traffic speed. The traffic speed prediction device 200 may update a weight of the traffic speed prediction model 630, such that a mean square error (MSE) is reduced.

According to an embodiment, the traffic speed prediction device 200 may identify whether a traffic speed and traffic volume increase or decrease over a time point and/or a time when the traffic speed and the traffic volume are greater than a specified value based on the first output data and the second output data, using the traffic speed prediction model 630, and may predict the traffic speed based on the identified result.

Figure 7:
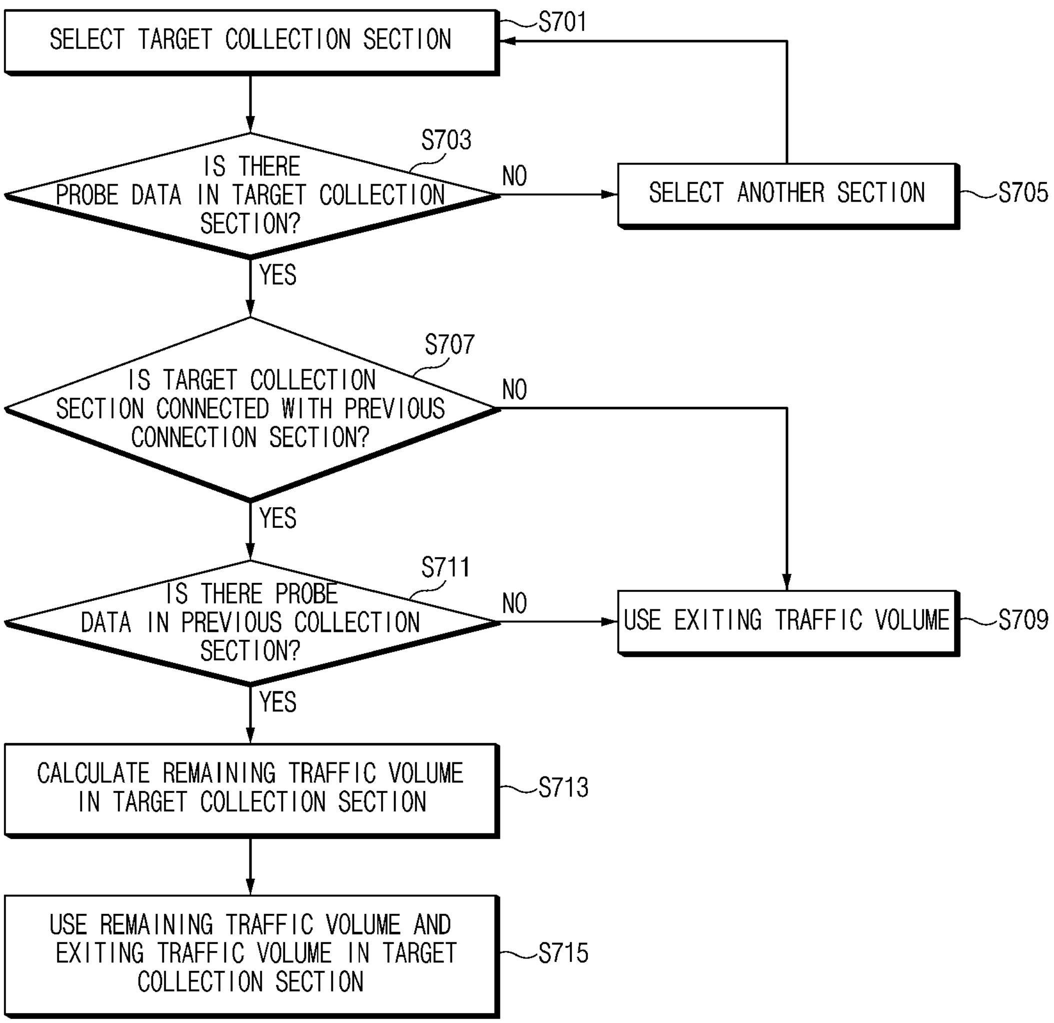
FIG. 7 is a flowchart illustrating calculating remaining traffic volume in a target road section in a traffic speed prediction device and a method therefor according to an embodiment of the present disclosure.

FIG. 7 is a flowchart illustrating calculating remaining traffic volume in a target road section in a traffic speed prediction device and a method therefor according to an embodiment of the present disclosure.

Operations in S701 to S715 in an embodiment below may be sequentially performed, but are not necessarily sequentially performed. For example, an order of the respective operations may be changed, and at least two operations may be performed in parallel.

Contents, which are duplicated with or correspond to the contents described above in conjunction with contents of FIG. 7, may be briefly described or omitted.

Referring to FIG. 7, in the traffic speed prediction device and the method therefor according to an embodiment, in S701, a processor may select a target collection section.

According to an embodiment, the processor may select a road section (or the target collection section) capable of collecting traffic volume data in the entire section of the road.

According to an embodiment, in S703, the processor may determine whether there is probe data in the target collection section.

According to an embodiment, the processor may determine whether probe data is detected in the target collection section.

As an example, the probe data may include GPS data, coordinate data, and/or time data.

According to an embodiment, when it is determined that there is no probe data in the target collection section (No of S703), in S705, the processor may select another section as the target collection section.

According to an embodiment, when it is determined that there is the probe data in the target collection section (YES of S703), in S707, the processor may determine whether the target collection section is connected with a previous collection section.

According to an embodiment, the processor may determine whether the target collection section is connected with the previous collection section, based on pieces of direction information included in pieces of link information of the target collection section and the previous collection section.

In detail, when a direction included in the link information of the target collection section and a direction included in the link information of the previous collection section are identical to each other, the processor may determine whether the target collection section is connected with the previous collection section.

According to an embodiment, when it is determined that the target collection section is not connected with the previous collection section (No of S707), in S709, the processor may use exiting traffic volume to predict a traffic speed.

For example, when the direction included in the link information of the target collection section and the direction included in the link information of the previous collection section are not identical to each other, the processor may determine whether the target collection section is not connected with the previous collection section.

According to an embodiment, when it is determined that the target collection section is not connected with the previous collection section, the processor may use exiting traffic volume to predict a traffic speed and may fail to use remaining traffic volume.

For example, when it is determined that the target collection section is not connected with the previous collection section, the processor may use data, which includes the exiting traffic volume and does not include the remaining traffic volume, as input data of a traffic speed prediction model.

According to an embodiment, when it is determined that the target collection section is connected with the previous collection section (Yes of S707), in S711, the processor may determine whether there is probe data in the previous collection section.

According to an embodiment, when it is determined that there is no probe data in the previous collection section (No of S711), in S709, the processor may use exiting traffic volume to predict a traffic speed.

According to an embodiment, when it is determined that there is no probe data in the previous collection section, the processor may use exiting traffic volume to predict a traffic speed and may fail to use remaining traffic volume.

For example, when it is determined that there is no probe data in the previous collection section, the processor may use data, which includes the exiting traffic volume and does not include the remaining traffic volume, as input data of the traffic speed prediction model.

According to an embodiment, when it is determined that there is the probe data in the previous collection section (YES of S711), in S713, the processor may calculate remaining traffic volume in the target collection section.

According to an embodiment, the processor may calculate the remaining traffic volume by subtracting the number of probe vehicles passing through a last point of the previous section from the number of probe vehicles passing through a last point of the target collection section.

According to an embodiment, the processor may classify and store the remaining traffic volume data in the target collection section at intervals of a collection time point and a collection time.

According to an embodiment, in S715, the processor may predict a traffic speed using the remaining traffic volume and the exiting traffic volume in the target collection section.

According to an embodiment, the processor may use data including the remaining traffic volume and the exiting traffic volume of the target collection section as input data of the traffic speed prediction model.

Figure 8:
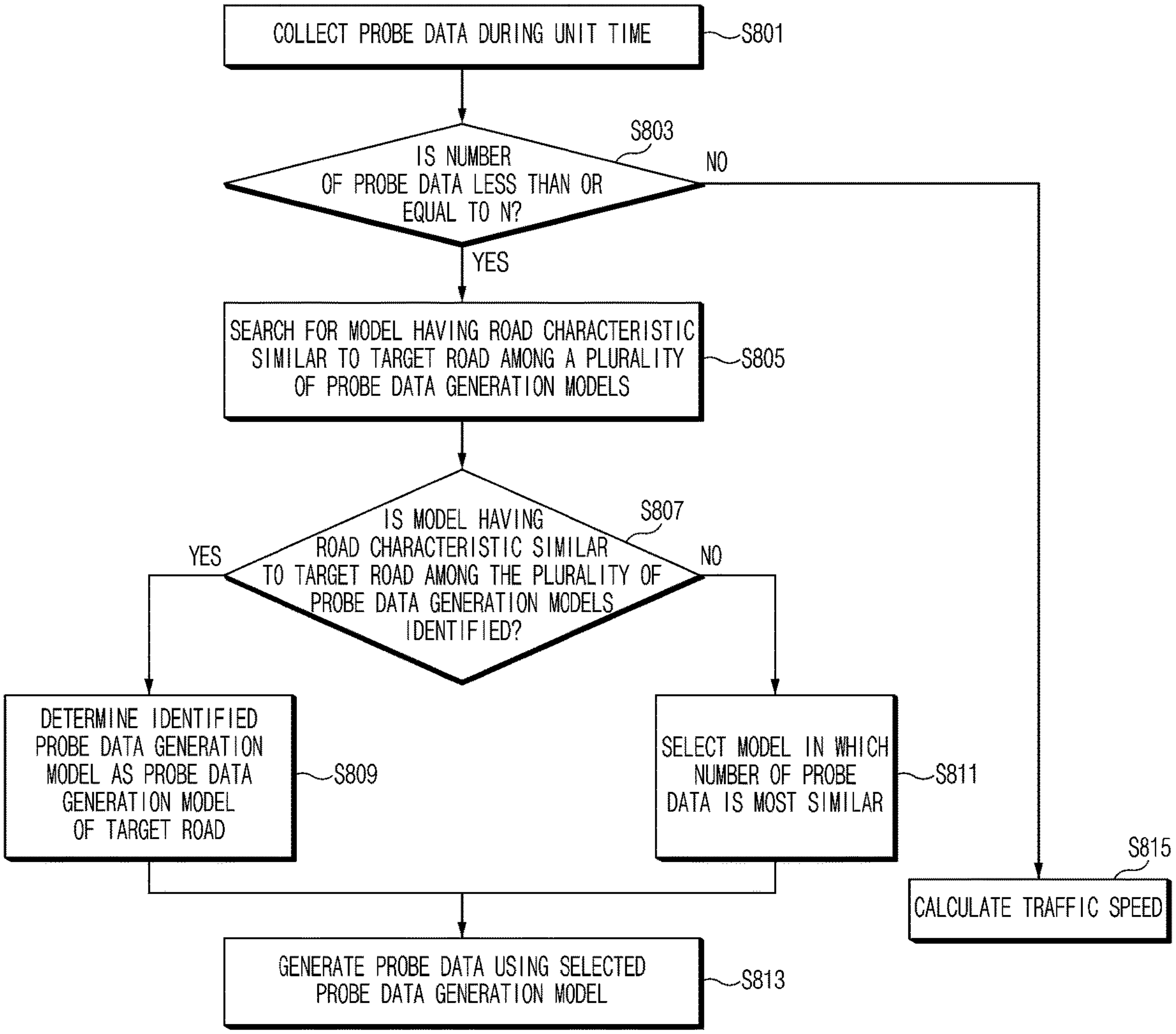
FIG. 8 is a flowchart illustrating generating probe data in a traffic speed prediction device and a method therefor according to an embodiment of the present disclosure.

FIG. 8 is a flowchart illustrating generating probe data in a traffic speed prediction device and a method therefor according to an embodiment of the present disclosure.

Operations in S801 to S815 in an embodiment below may be sequentially performed, but are not necessarily sequentially performed. For example, an order of the respective operations may be changed, and at least two operations may be performed in parallel.

Referring to FIG. 8, in the traffic speed prediction device and the method therefor according to an embodiment, in S801, the processor may collect probe data during a unit time.

According to an embodiment, the processor may receive probe data from a probe vehicle which travels on a target road through a communication module. For example, the target road may include a first section and a second section in the present disclosure.

According to an embodiment, the processor may collect probe data (or sample data) from the target road during a unit time (e.g., 5 minutes).

According to an embodiment, in S803, the processor may determine whether the number of probe data is less than or equal to N.

According to an embodiment, the processor may determine whether the number of probe data collected during the unit time (e.g., 5 minutes) is less than or equal to N (e.g., 30).

According to an embodiment, when it is determined that the number of the probe data is greater than N (No of S803), in S815, the processor may calculate a traffic speed of a road including a target road based on the collected probe data.

For example, when it is determined that the number of the probe data is greater than 30, the processor may calculate a traffic speed of the target road based on the collected probe data.

According to an embodiment, when it is determined that the number of the probe data is less than or equal to N (Yes of S803), in S805, the processor may search for a model having a road characteristic similar to the target road among a plurality of probe data generation models.

For example, the plurality of probe data generation models may be stored in a memory.

According to an embodiment, when it is determined that the number of the probe data is less than or equal to N, the processor may search for whether there is a probe data generation model, corresponding to a road characteristic with the highest similarity with a road characteristic in which probe data is collected, among the plurality of probe data generation models.

According to an embodiment, in S807, the processor may determine whether a model having a road characteristic similar to the target road among the plurality of probe data generation models is identified.

According to an embodiment, when the model having the road characteristic similar to the target road among the generated models is identified (Yes of S807), in S809, the processor may select the identified probe data generation model as a probe data generation model of the target road.

For example, the road characteristic may include at least one of a type of the road, the number of lanes, a length of the road, a shape of the road, or a combination thereof.

According to an embodiment, when the model having the road characteristic similar to the target road among the generated models is not identified (No of S807), in S811, the processor may select a model in which the number of probe data is most similar.

According to an embodiment, when the model having the road characteristic similar to the target road among the generated models is not identified, the processor may determine a probe data generation model, which has the number of probe vehicles with the smallest difference with the number of probe vehicles collected on the target road as a characteristic of the road, a probe data generation model.

According to an embodiment, in S813, the processor may generate probe data, based on the selected probe data generation model.

According to an embodiment, the processor may generate probe data until the reliability of the traffic speed of the road is ensured, based on the probe data generation model.

According to the above-mentioned embodiment, the traffic speed prediction device according to an embodiment of the present disclosure may improve the reliability of traffic volume data using the probe data generation model, such that a correlation between the traffic volume data and a future traffic speed is ensured without deviation according to an area.

Furthermore, according to the above-mentioned embodiment, the traffic speed prediction device according to an embodiment of the present disclosure may improve the reliability of traffic volume data using the probe data generation model, thus improving a model for predicting a future traffic speed using remaining traffic volume.

Figure 9:
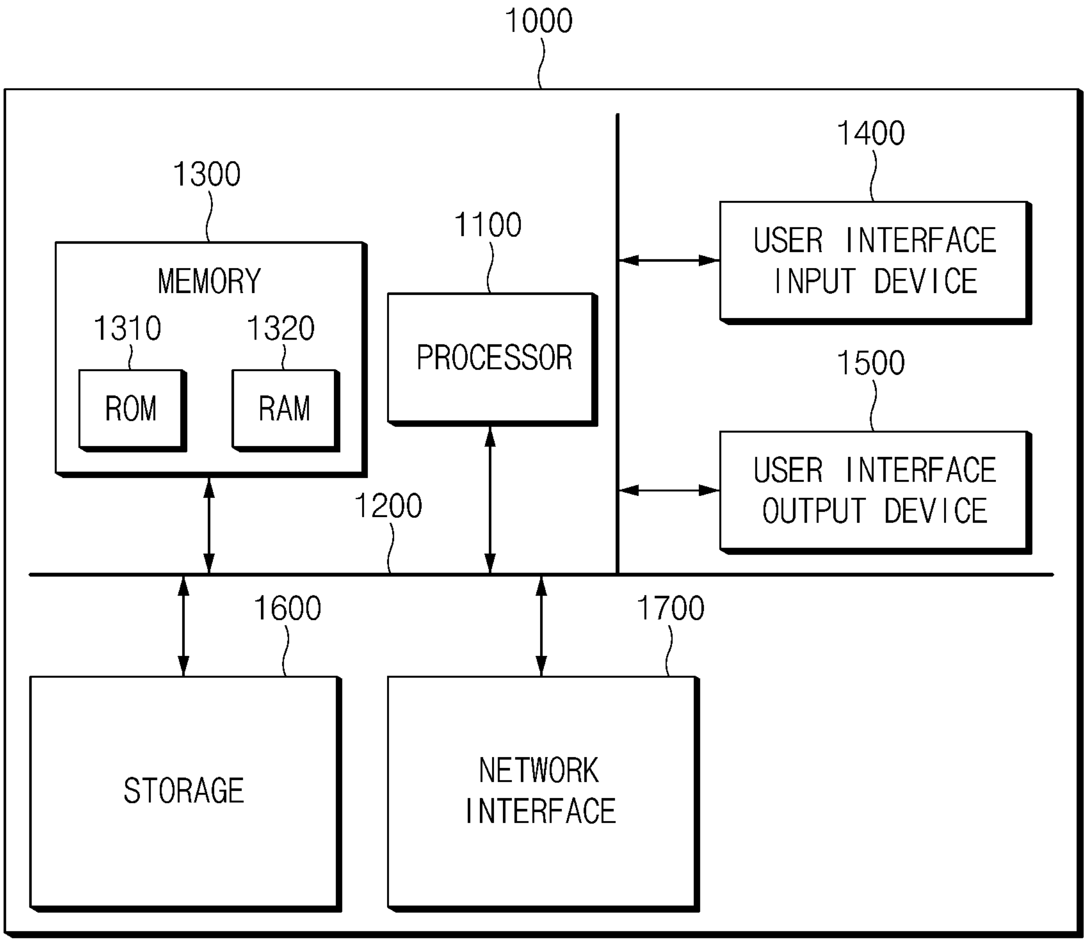
FIG. 9 illustrates a computing system about a traffic speed prediction device and a method therefor according to an embodiment of the present disclosure.

FIG. 9 illustrates a computing system about a traffic speed prediction device and a method therefor according to an embodiment of the present disclosure.

Referring to FIG. 9, a computing system 1000 about the traffic speed prediction device and the method therefor may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the traffic speed prediction device and the method therefor according to an embodiment of the present disclosure.

According to at least one of embodiments of the present disclosure, the traffic speed prediction device may improve the performance of future traffic speed prediction using remaining traffic volume.

According to at least one of embodiments of the present disclosure, the traffic speed prediction device may easily predict a future traffic speed using remaining traffic volume even when vehicles enter from several roads, for example, at an intersection of a city road.

According to at least one of embodiments of the present disclosure, the traffic speed prediction device may easily determine congestion using remaining traffic volume even when there is no blockage of traffic flow by signals, for example, on a highway.

According to at least one of embodiments of the present disclosure, the traffic speed prediction device may improve the performance of future traffic speed prediction in both of characteristics of two types of roads such as a city road and a highway using remaining traffic volume.

According to at least one of embodiments of the present disclosure, the traffic speed prediction device may accurately predict a traffic speed of the road, thus improving the accuracy of arrival time prediction.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A traffic speed prediction device comprising:

a communication module configured to receive probe data from probe vehicles traveling on a road;

a memory configured to store a traffic speed prediction model and a plurality of probe data generation models; and at least one processor electrically connected with the communication module and the memory, wherein the at least one processor is configured to:

determine a second section connected with a first section, wherein the second section is a target road section and the first section includes a road section in front of the second section;

output first output data using traffic speed data during a first time, the traffic speed data being obtained based on the probe data collected in the first section and the second section;

output second output data using traffic volume data during a second time, the traffic volume data being obtained based on the probe data collected in the first section and the second section;

determine the probe vehicles in the first section and the second section during a time unit;

when a number of the probe vehicles is less than or equal to a threshold, search for whether there is a probe data generation model of the plurality of probe data generation models corresponding to a particular road characteristic with a highest similarity with a road characteristic in which probe data is collected, among the plurality of probe data generation models, wherein the road characteristic includes at least one of a type of the road, a number of lanes, a length of the road, or a shape of the road;

when the probe data generation model based on the highest similarity with the road characteristic is not identified, determine one probe data generation model, which has the number of probe vehicles with a smallest difference with the number of probe vehicles collected on the target road section as a characteristic of the road;

generate probe data until a reliability of the traffic speed of the road is ensured, based on the determined probe data generation model;

determine whether to use a remaining traffic volume based on whether the target road section is connected to the first section and whether probe data exists in the first section;

predict a traffic speed of the road including the second section using the first output data and the second output data, and the generated probe data; and determine, based on the predicted traffic speed of the road, an estimated time of arrival of the probe vehicles.

2. The traffic speed prediction device of claim 1, wherein the at least one processor is configured to calculate the remaining traffic volume corresponding to a number of probe vehicles which are traveling in the second section, using the probe data in the second section and the probe data in the first section when the probe data in the first section is available, and wherein the second output data includes the remaining traffic volume.

3. The traffic speed prediction device of claim 2, wherein the remaining traffic volume is calculated by subtracting a number of probe vehicles passing through a last point of the first section from a number of probe vehicles passing through a last point of the second section.

4. The traffic speed prediction device of claim 2, wherein the at least one processor is configured to calculate an existing traffic volume corresponding to a number of probe vehicles passing through a last point of the second section when no probe data in the first section is available, and wherein the second output data includes the existing traffic volume without including the remaining traffic volume.

5. The traffic speed prediction device of claim 1, wherein the at least one processor is configured to:

obtain input data calculated by performing a concatenate operation of the first output data and the second output data, and predict a traffic speed during a specified third time in a future using the input data.

6. The traffic speed prediction device of claim 5, wherein the at least one processor is configured to learn a weight such that a mean squared error (MSE) of the predicted traffic speed during the third time is reduced.

7. The traffic speed prediction device of claim 1, wherein the first time and the second time correspond to the same past time.

8. The traffic speed prediction device of claim 1, wherein the at least one processor is configured to determine the target road section, based on at least one of direction information included in link information of the first section and the second section, whether probe data is detected in the first section, or a combination thereof.

9. A method comprising:

determining, by at least one processor, a second section connected with a first section, wherein the second section is a target road section and the first section includes a road section in front of the second section;

outputting, by the at least one processor, first output data using traffic speed data during a first time, the traffic speed data being obtained based on probe data collected in the first section and the second section;

outputting, by the at least one processor, second output data using traffic volume data during a second time, the traffic volume data being obtained based on the probe data collected in the first section and the second section;

accessing, by the at least one processor, a plurality of probe data generation models stored in a memory;

determining, by the at least one processor, probe vehicles in the first section and the second section during a time unit;

when a number of the probe vehicles is less than or equal to a threshold, searching, by the at least one processor, for whether there is a probe data generation model of the plurality of probe generation models corresponding to a particular road characteristic with a highest similarity with a road characteristic in which probe data is collected, wherein the road characteristic includes at least one of a type of the road, a number of lanes, a length of the road, or a shape of the road;

when the probe data generation model based on the highest similarity with the road characteristics is not identified, determining, by the at least one processor, one probe data generation model having a smallest difference between the number of probe vehicles collected on the target road section and the number of probe vehicles of the probe data generation model as a characteristic of the road;

generating, by the at least one processor, probe data until a reliability of the traffic speed of the road is ensured, based on the determined probe data generation model;

determining, by the at least one processor, whether to use a remaining traffic volume based on whether the target road section is connected to the first section and whether probe data exists in the first section;

predicting, by the at least one processor, a traffic speed of a road including the second section using the first output data and the second output data, and the generated probe data; and determining, by the at least one processor, based on the predicted traffic speed of the road, an estimated time of arrival of the probe vehicles.

10. The method of claim 9, further comprising calculating, by the at least one processor, the remaining traffic volume corresponding to a number of probe vehicles, which are traveling in the second section, using the probe data in the second section and the probe data in the first section when the probe data in the first section is available, wherein the second output data includes the remaining traffic volume.

11. The method of claim 10, wherein the remaining traffic volume is calculated by subtracting a number of probe vehicles passing through a last point of the first section from a number of probe vehicles passing through a last point of the second section.

12. The method of claim 10, further comprising calculating, by the at least one processor, an existing traffic volume corresponding to the number of probe vehicles passing through a last point of the second section when no probe data in the first section is available, wherein the second output data includes the existing traffic volume without including the remaining traffic volume.

13. The method of claim 9, further comprising:

obtaining, by the at least one processor, input data calculated by performing a concatenate operation of the first output data and the second output data; and predicting, by the at least one processor, a traffic speed during a specified third time in a future using the input data.

14. The method of claim 13, further comprising learning, by the at least one processor, a weight such that a mean squared error (MSE) of the predicted traffic speed during the third time is reduced.

15. The method of claim 9, wherein the first time and the second time correspond to the same past time.

16. The method of claim 9, wherein determining the second section as the target road section includes determining, by the at least one processor, the target road section, based on at least one of direction information included in link information of the first section and the second section.

* * * * *